(12) United States Patent
Burnham et al.

(10) Patent No.: US 12,393,933 B2
(45) Date of Patent: *Aug. 19, 2025

(54) GENERATING A BLENDED FX PORTFOLIO

(71) Applicant: Chicago Mercantile Exchange Inc., Chicago, IL (US)

(72) Inventors: Simon Burnham, Chicago, IL (US); Dhiraj Bawadhankar, Aurora, IL (US); Steve Dayon, Huntley, IL (US); John Redfield, Brooklyn, NY (US); Fateen Sharaby, Hoboken, NJ (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 111 days.

This patent is subject to a terminal disclaimer.

(21) Appl. No.: 17/863,862

(22) Filed: Jul. 13, 2022

(65) Prior Publication Data
US 2022/0351190 A1 Nov. 3, 2022

Related U.S. Application Data

(63) Continuation of application No. 16/939,894, filed on Jul. 27, 2020, now Pat. No. 11,423,397, which is a (Continued)

(51) Int. Cl.
G06Q 20/38 (2012.01)
G06Q 40/04 (2012.01)
G06Q 40/06 (2012.01)

(52) U.S. Cl.
CPC ........... *G06Q 20/381* (2013.01); *G06Q 40/04* (2013.01); *G06Q 40/06* (2013.01)

(58) Field of Classification Search
CPC ....... G06Q 20/381; G06Q 40/04; G06Q 40/06
(Continued)

(56) References Cited

U.S. PATENT DOCUMENTS 5,068,816 A 11/1991 Noetzel
5,274,813 A 12/1993 Itoh
(Continued)

FOREIGN PATENT DOCUMENTS

CA 2290368 A1 12/1998
DE 10142024 A1 * 3/2003 ............. H03M 7/30
(Continued)

OTHER PUBLICATIONS

Li, Bin, and Steven CH Hoi. "Online portfolio selection: A survey." ACM Computing Surveys (CSUR) 46.3 (2014): 1-36. (Year: 2014).*
(Continued)

*Primary Examiner* — Virpi H Kanervo
(74) *Attorney, Agent, or Firm* — Lempia Summerfield Katz LLC

(57) ABSTRACT

Systems and methods for blending a plurality of FX forwards may include determining a signed sum of notional values associated with each of the primary currency component and the settlement currency component of each of the plurality of FX forwards for use in blending the plurality of FX forwards, each of the plurality of FX forwards having matching economics and a different associated fixed rate. A computing device may determine one or more remnant FX forwards to blend the plurality of FX forwards based, at least in part, using the determined sums of the notional values. This may reduce the gross notional and/or the total clearing line items associated with the original FX forwards. In some cases, the computing device may determine a single currency FX forward for blending the plurality of FX forwards.

31 Claims, 6 Drawing Sheets

Related U.S. Application Data continuation of application No. 14/928,104, filed on Oct. 30, 2015, now Pat. No. 10,789,588.

(60) Provisional application No. 62/073,612, filed on Oct. 31, 2014.

(58) Field of Classification Search
USPC .................................................. 705/37
See application file for complete search history.

(56) References Cited

U.S. PATENT DOCUMENTS

| | | | |
|---|---|---|---|
| 5,978,511 A | 11/1999 | Horiuchi | |
| 6,064,985 A | 5/2000 | Anderson | |
| 6,278,981 B1* | 8/2001 | Dembo | G06Q 40/02 705/36 R |
| 6,282,520 B1 | 8/2001 | Schirripa | |
| 6,304,858 B1 | 10/2001 | Mosler | |
| 6,317,727 B1 | 11/2001 | May | |
| 6,333,788 B1 | 12/2001 | Yamada | |
| 6,385,249 B1 | 5/2002 | Kondo | |
| 6,424,972 B1 | 7/2002 | Berger | |
| 7,222,317 B1 | 5/2007 | Mathur | |
| 7,236,952 B1 | 6/2007 | D, Zmura | |
| 7,349,878 B1 | 3/2008 | Makivic | |
| 7,430,539 B2 | 9/2008 | Glinberg | |
| 7,509,275 B2 | 3/2009 | Glinberg | |
| 7,580,876 B1 | 8/2009 | Phillips | |
| 7,587,641 B1 | 9/2009 | Sloane | |
| 7,734,538 B2 | 6/2010 | Bauerschmidt | |
| 7,822,668 B1 | 10/2010 | Benda | |
| 7,870,052 B1 | 1/2011 | Goldberg | |
| 8,108,281 B2 | 1/2012 | Koblas | |
| 8,165,942 B1 | 4/2012 | Rordorf | |
| 8,275,741 B2* | 9/2012 | Tysowski | G06F 16/40 709/248 |
| 8,301,537 B1 | 10/2012 | Rachev | |
| 8,515,058 B1 | 8/2013 | Gentry | |
| 8,805,735 B1 | 8/2014 | Goldberg | |
| 8,862,560 B1 | 10/2014 | Wu | |
| 9,396,131 B1 | 7/2016 | Hendry | |
| 2002/0002528 A1 | 1/2002 | Terada | |
| 2002/0038272 A1 | 3/2002 | Menchero | |
| 2002/0138386 A1 | 9/2002 | Maggioncalda | |
| 2003/0036918 A1 | 2/2003 | Pintsov | |
| 2003/0055777 A1 | 3/2003 | Ginsberg | |
| 2003/0061577 A1 | 3/2003 | Saluja | |
| 2003/0101026 A1 | 5/2003 | Rabinowitz | |
| 2003/0236738 A1 | 12/2003 | Lange | |
| 2004/0098327 A1* | 5/2004 | Seaman | G06Q 40/04 705/36 R |
| 2004/0177023 A1 | 9/2004 | Krowas | |
| 2004/0186804 A1 | 9/2004 | Chakraborty | |
| 2004/0199448 A1 | 10/2004 | Chalermkraivuth | |
| 2004/0205457 A1 | 10/2004 | Bent | |
| 2004/0220870 A1 | 11/2004 | Lundberg | |
| 2005/0050372 A1 | 3/2005 | Hagiwara | |
| 2005/0055301 A1 | 3/2005 | Cohen | |
| 2005/0096950 A1 | 5/2005 | Caplan | |
| 2006/0059067 A1 | 3/2006 | Glinberg | |
| 2006/0112049 A1 | 5/2006 | Mehrotra | |
| 2006/0212376 A1* | 9/2006 | Snyder | G06Q 40/06 705/35 |
| 2006/0224494 A1 | 10/2006 | Pinkava | |
| 2006/0259378 A1 | 11/2006 | Fornasari | |
| 2007/0033123 A1 | 2/2007 | Navin | |
| 2007/0083586 A1 | 4/2007 | Luo | |
| 2007/0156555 A1 | 7/2007 | Orr | |
| 2007/0186206 A1 | 8/2007 | Abrams | |
| 2007/0198387 A1 | 8/2007 | Uenohara | |
| 2007/0244785 A1 | 10/2007 | Williams | |
| 2007/0271204 A1 | 11/2007 | Jiang | |
| 2007/0288351 A1 | 12/2007 | Huntley | |
| 2008/0120251 A1 | 5/2008 | Tyagi | |
| 2008/0183615 A1 | 7/2008 | Rio | |
| 2008/0196076 A1 | 8/2008 | Shatz | |
| 2008/0235172 A1 | 9/2008 | Rosenstein | |
| 2008/0249956 A1 | 10/2008 | Connors | |
| 2008/0249958 A1 | 10/2008 | Anguish | |
| 2008/0294571 A1 | 11/2008 | Maloney | |
| 2008/0319920 A1 | 12/2008 | Levin | |
| 2009/0138536 A1 | 5/2009 | Chao | |
| 2009/0171826 A1 | 7/2009 | Hadi | |
| 2009/0216824 A1 | 8/2009 | Weinberg | |
| 2009/0248564 A1 | 10/2009 | Fallon | |
| 2009/0265284 A1 | 10/2009 | Rowell | |
| 2009/0281956 A1 | 11/2009 | An | |
| 2009/0299910 A1 | 12/2009 | Khuong-huu | |
| 2009/0307124 A1 | 12/2009 | Meyerhoff, II | |
| 2010/0106633 A1 | 4/2010 | Iyer | |
| 2010/0138362 A1 | 6/2010 | Whitehurst | |
| 2010/0145875 A1 | 6/2010 | Schmid | |
| 2010/0259204 A1 | 10/2010 | Imura | |
| 2010/0280970 A1 | 11/2010 | Lai | |
| 2010/0281086 A1 | 11/2010 | Ganai | |
| 2010/0323350 A1 | 12/2010 | Gordon | |
| 2010/0328530 A1 | 12/2010 | Hashimoto | |
| 2011/0004568 A1 | 1/2011 | Phillips | |
| 2011/0035342 A1 | 2/2011 | Koblas | |
| 2011/0060603 A1 | 3/2011 | Capelli | |
| 2011/0153521 A1 | 6/2011 | Green | |
| 2011/0161244 A1 | 6/2011 | Iyer | |
| 2011/0221489 A1 | 9/2011 | Tarng | |
| 2012/0296793 A1 | 11/2012 | Wilson, Jr. | |
| 2013/0018769 A1 | 1/2013 | Boudreault | |
| 2013/0018818 A1 | 1/2013 | Yadav | |
| 2013/0036074 A1 | 2/2013 | Kaestel | |
| 2013/0041799 A1 | 2/2013 | Nyhoff | |
| 2013/0041843 A1 | 2/2013 | Nyhoff | |
| 2013/0117197 A1 | 5/2013 | Shah | |
| 2013/0241933 A1 | 9/2013 | Thatcher | |
| 2013/0282554 A1 | 10/2013 | Boberski | |
| 2013/0339272 A1 | 12/2013 | Willism, III | |
| 2014/0023167 A1 | 1/2014 | Meyer | |
| 2014/0258072 A1 | 9/2014 | Mayor | |
| 2014/0354636 A1 | 12/2014 | Systemes | |
| 2015/0063374 A1 | 3/2015 | Venkatachalam Jayaraman | |
| 2015/0324914 A1 | 11/2015 | Zhan et al. | |
| 2015/0365619 A1 | 12/2015 | Mayer | |
| 2015/0379643 A1 | 12/2015 | Boberski et al. | |
| 2016/0246266 A1 | 8/2016 | Kniazev | |
| 2016/0285571 A1 | 9/2016 | Badiu | |
| 2017/0061329 A1 | 3/2017 | Kobayashi | |

FOREIGN PATENT DOCUMENTS

| | | |
|---|---|---|
| JP | 3573072 B2 | 7/2004 |
| WO | 0150776 A3 | 5/2002 |
| WO | 2017146707 A1 | 8/2017 |

OTHER PUBLICATIONS

Y. He et al., "RCFile: A fast and space-efficient data placement structure in MapReduce-based warehouse systems," 2011 IEEE 27th International Conference on Data Engineering, Hannover, Germany, 2011, pp. 1199-1208. (Year: 2011).*

C. Y. Belentepe and A. J. Wyner, "A statistical view of universal stock market portfolios," Proceedings. International Symposium on Information Theory, 2005. ISIT 2005., Adelaide, SA, Australia, 2005, pp. 573-577. (Year: 2005).*

Becker, Lukas. "Addressing compression." Risk (2014): 38. (Year: 2014).*

Lo, Andrew W., and Jiang Wang. "Trading volume: definitions, data analysis, and implications of portfolio theory." The Review of Financial Studies 13.2 (2000): 257-300. (Year: 2000).*

T. M. Cover and E. Ordentlich, "Universal portfolios with side information," in IEEE Transactions on Information Theory, vol. 42, No. 2, pp. 348-363, Mar. 1996. (Year: 1996).*

H. H. Permuter, Y. -H. Kim and T. Weissman, "Interpretations of Directed Information in Portfolio Theory, Data Compression, and

(56) References Cited

OTHER PUBLICATIONS

Hypothesis Testing," in IEEE Transactions on Information Theory, vol. 57, No. 6, pp. 3248-3259, Jun. 2011. (Year: 2011).*
P. A. Franaszek, P. Heidelberger, D. E. Poff and J. T. Robinson, "Algorithms and data structures for compressed-memory machines," in IBM Journal of Research and Development, vol. 45, No. 2, pp. 245-258, Mar. 2001. (Year: 2001).*
ICAP, TriOptima and LCH.Clearnet Compression of Cleared Interest Rate Swaps Exceeds $100 trillion in Notional; $20.4 trillion Compressed in 2012 Alone, http://www.icap.com/news/2012/trioptima-swap-clear-usd100+trillion.aspx, 2 pages, Feb. 23, 2012.
International Search Report from International Application No. PCT/US2015/029941, dated Aug. 10, 2015, 2 pages.
ISDA, Interest Rate Swaps Compression: A Progress Report, ISDA Study, 9 pages, Feb. 2012.
Labuszewski et al., "Speculative Strategies with Treasury Options", CME Group, Nov. 11, 2013, 36 pages.
Orcun Kaya, Deutsche Bank, Reforming OTC Derivatives Markets Observable Changes and Open Issues, 2013, Deutsche Bank AG, DB Research, 24 pages, Aug. 7, 2013.
Permuteretal. Interpretations of Directed Information in Portfolio Theory, Data Compression, and Hypothesis Testing. IEEE Transactions on Information Theory, vol. 57, No. 6, Jun. 2011. (Year: 2011).
Risk Management—Portfolio Compression for Outstanding Interest Rate Swap Trades. https:l/www.ccilindia.com/RiskManagement/Pages/Portfoliocompression.aspx. © 2014, Developed by NSE-IT and Maintained by CCI L-IT, 1 page, May 6, 2014.

\* cited by examiner

| | Product | Rate | Notional USD | B/S | Signed USD Notional | | Weighted US Notional | Notional BBL | Signed BBL Amount |
|---|---|---|---|---|---|---|---|---|---|
| Trade 1 | USDBRL | 2.4125 | 25,000,000.00 | B | 25,000,000.00 | | 60,312,500.00 | 60,312,500.00 | (60,312,500.00) |
| Trade 2 | USDBRL | 2.4149 | 32,000,000.00 | S | (32,000,000.00) | | (77,276,800.00) | 77,276,800.00 | 77,276,800.00 |
| Trade 3 | USDBRL | 2.4004 | 9,000,000.00 | B | 9,000,000.00 | | 21,603,600.00 | 21,603,600.00 | (21,603,600.00) |
| Trade 4 | USDBRL | 2.3983 | 5,600,000.00 | S | (5,600,000.00) | | (13,430,480.00) | 13,430,480.00 | 13,430,480.00 |
| Trade 5 | USDBRL | 2.3546 | 2,350,000.00 | B | 2,350,000.00 | | 5,533,310.00 | 5,533,310.00 | (5,533,310.00) |
| Trade 6 | USDBRL | 2.3997 | 2,677,056.32 | S | (2,677,056.32) | | (6,421,455.00) | 6,421,455.00 | 6,421,455.00 |
| Trade 7 | USDBRL | 2.4126 | 6,500,000.00 | B | 6,500,000.00 | | 15,682,225.00 | 15,682,225.00 | (15,682,225.00) |
| Trade 8 | USDBRL | 2.4987 | 12,000,000.00 | S | (12,000,000.00) | | (29,985,000.00) | 29,985,000.00 | 29,985,000.00 |
| Trade 9 | USDBRL | 2.3982 | 10,000,000.00 | B | 10,000,000.00 | | 23,982,100.00 | 23,982,100.00 | (23,982,100.00) |
| Sum | | | 105,127,056.32 | | 572,943.68 | | | | |
| USDUSD | Notional | 1 | | | 572,943.68 | | | | |

Figure 3

| | 911 → Product | 912 → Rate | 921 → Notional USD | 922 → B/S | 923 → Signed USD Notional | 924 → Weighted US Notional | 931 → Notional BRL | 933 → Signed BRL Amount |
|---|---|---|---|---|---|---|---|---|
| Trade 1 | USD&BRL | 2.41215 | 25,000,000.00 | B | 25,000,000.00 | 60,312,500.00 | 60,312,500.00 | (60,312,500.00) |
| Trade 2 | USD&BRL | 2.41489 | 32,000,000.00 | S | (32,000,000.00) | (77,276,800.00) | 77,276,800.00 | 77,276,800.00 |
| Trade 3 | USD&BRL | 2.40004 | 9,000,000.00 | B | 9,000,000.00 | 21,603,600.00 | 21,603,600.00 | (21,603,600.00) |
| Trade 4 | USD&BRL | 2.39983 | 5,600,000.00 | S | (5,600,000.00) | (13,430,480.00) | 13,430,480.00 | 13,430,480.00 |
| Trade 5 | USD&BRL | 2.35461 | 2,350,000.00 | B | 2,350,000.00 | 5,533,310.00 | 5,533,310.00 | (5,533,310.00) |
| Trade 6 | USD&BRL | 2.39867 | 7,500,000.00 | S | (7,500,000.00) | (17,990,250.00) | 17,990,250.00 | 17,990,250.00 |
| Trade 7 | USD&BRL | 2.41265 | 6,500,000.00 | B | 6,500,000.00 | 15,682,225.00 | 15,682,225.00 | (15,682,225.00) |
| Trade 8 | USD&BRL | 2.49875 | 12,000,000.00 | S | (12,000,000.00) | (29,985,000.00) | 29,985,000.00 | 29,985,000.00 |
| Trade 9 | USD&BRL | 2.39821 | 10,000,000.00 | B | 10,000,000.00 | 23,982,100.00 | 23,982,100.00 | (23,982,100.00) |
| | | Sum | 109,950,000.00 | | (4,250,000.00) | (11,568,795.00) | | 11,568,795.00 |
| | | Notional | | | | | | |
| Remnant 1 | | 2.49875 | (10,834,165.80) | | 27,071,871.79 | | | |
| Remnant 2 | | 2.35461 | 6,584,165.90 | | (15,503,076.79) | | | |
| | | | (4,250,000.00) | | 11,568,795.00 | | | |

Figure 4

| | Product | Rate | Notional USD | B/S | Signed USD Notional | Weighted US Notional | Notional BRL | Signed BRL Amount |
|---|---|---|---|---|---|---|---|---|
| Trade 1 | USDBRL | 2.4125 | 25,000,000.00 | B | 25,000,000.00 | 60,312,500.00 | 60,312,500.00 | 60,312,500.00 |
| Trade 2 | USDBRL | 2.4149 | 32,000,000.00 | S | (32,000,000.00) | (77,276,800.00) | 77,276,800.00 | (77,276,800.00) |
| Trade 3 | USDBRL | 2.4034 | 9,000,000.00 | B | 9,000,000.00 | 21,603,600.00 | 21,603,600.00 | (21,603,600.00) |
| Trade 4 | USDBRL | 2.3983 | 5,600,000.00 | S | (5,600,000.00) | (13,430,480.00) | 13,430,480.00 | 13,430,480.00 |
| Trade 5 | USDBRL | 2.3546 | 2,350,000.00 | B | 2,350,000.00 | 5,533,310.00 | 5,533,310.00 | (5,533,310.00) |
| Trade 6 | USDBRL | 2.3987 | 7,500,000.00 | S | (7,500,000.00) | (17,990,250.00) | 17,990,250.00 | 17,990,250.00 |
| Trade 7 | USDBRL | 2.4126.5 | 6,500,000.00 | B | 6,500,000.00 | 15,682,225.00 | 15,682,225.00 | (15,682,225.00) |
| Trade 8 | USDBRL | 2.49975 | 12,000,000.00 | S | (12,000,000.00) | (29,985,000.00) | 29,985,000.00 | 29,985,000.00 |
| Trade 9 | USDBRL | 2.39821 | 10,000,000.00 | B | 10,000,000.00 | 23,982,100.00 | 23,982,100.00 | (23,982,100.00) |
| | | sum | 109,950,000.00 | | (4,250,000.00) | (11,568,795.00) | | 11,568,795.00 |
| Remnant 1 | | 2.49975 | (4,629,832.92) | | | | | |
| USDUSD | | 1 | 379,832.92 | | 11,568,795.00 | | | |
| | | Notional | (4,250,000.00) | | 11,568,795.00 | | | |

Figure 5

GENERATING A BLENDED FX PORTFOLIO

REFERENCE TO RELATED APPLICATIONS

This application is a continuation under 37 C.F.R. § 1.53(b) of U.S. patent application Ser. No. 16/939,894 filed Jul. 27, 2020, now U.S. Pat. No. 11,423,397, which is a continuation under 37 C.F.R. § 1.53(b) of U.S. patent application Ser. No. 14/928,104 filed Oct. 30, 2015, now U.S. Pat. No. 10,789,588, which claims priority to U.S. provisional patent application Ser. No. 62/073,612, filed Oct. 31, 2014, the entire disclosures of which are hereby incorporated by reference and relied upon.

BACKGROUND

Over-the-counter (OTC) products include financial instruments that are bought, sold, traded, exchanged, and/or swapped between counterparties. Many OTC derivatives exist to fill a wide range of needs for counterparties, including limiting or mitigating exposure to risks and/or maximizing cash flow. After an exchange of an OTC product, counterparties may expend resources managing the product for the duration of its life. Management may be complicated based on the number of exchanges and/or the specific terms of the transaction.

The foreign exchange (FX) currency market is a global market allowing market participants to buy, sell, trade and otherwise speculate on for the trading of currencies and may be considered to be one of the largest, and most liquid, financial markets in the world. In some cases, an investor (e.g., an institutional investor, an individual investor) may desire to manage risk exposure associated with the FX market, such as risk exposure associated with foreign exchange rates. These risks may result in uncertainty in managing cash flows, planning future business expansions and/or the like. On the FX currency market, currencies are typically traded in pairs, such as a U.S. dollar/Japanese yen pair (USD/JPY) a Euro/U.S. dollar pair (EUR/USD), and the like. In some cases, FX forwards products may be referenced as currency pairs against the U.S. dollar, such as Euros vs. U.S. dollars (EUR/USD), U.S. dollars vs. Japanese yen (USD/JPY), British pounds vs. U.S. dollars (GBP/USD), U.S. dollars vs. Swiss francs (USD/CHF), U.S. dollars vs. Canadian dollars (USD/CAD), Australian dollars vs. USD (AUD/USD), U.S. dollars vs. Mexican pesos (USD/MXN), New Zealand dollars vs. USD (NZD/USD), U.S. dollars vs. Russian ruble (USD/RUB), U.S. dollars vs. South African rand (USD/ZAR), U.S. dollars vs. Brazilian real (USD/BRL), U.S. dollars vs. Chinese Renminbi (USD/RMB), U.S. dollars vs. Korean won (USD/KRW), and many others.

In the OTC foreign exchange (FX) market place there are several products that are traded. Illustrative examples of these products may include OTC FX Cash Settled Forwards (CSF's), OTC FX Non Deliverable Forwards (NDF's), and the like. In CSF's, the associated currency pair corresponds to two currencies that are deliverable such as the EUR/USD currency pair. An exposure for the CSF is calculated in reference to a single currency of choice and the value moves accordingly. In the NDF products, the associated currency pair includes one currency that is deliverable whereas the other currency is non-deliverable such as USD/BRL. Here, the exposure may be calculated and move in reference to the deliverable currency. In the illustrative USD/BRL example, the exposure will move in USD.

When entering either of these trades an initial "Trade Price" is agreed upon by both participants and a value date at which the exposure will be exchanged. There are specific rules around how the exposure will be calculated using an agreed upon source for a "Fixing Price" on the "fixing date" and the difference between the Fixing Price and Trade Price. In some cases, the Trade Price and the Fixing Price may be referenced in terms of an exchange rate between the two currencies, such that both the Trade Price and the Fixing Price may be calculated using the exchange rate on the trade date (e.g., a Trade Exchange Rate") and the termination date (e.g., a "Fixing Exchange Rate"), respectively. As markets move, the Trade Price, and/or the Trade Exchange Rate, may be different at different times for the same fixing date. If a counterparty is facing a single counterparty such a central counterparty but has various trades with identical terms but different Trade Price, then all these trades will be open line items in their respective portfolios. As such, financial institutions, such as a financial exchange, a bank, an investment broker, etc. may face an increased need for data storage and/or computing capacity to manage one or more of these large portfolios.

SUMMARY

Currently, financial institutions and other institutional investors such as banks trade FX forwards over the counter (OTC). These FX forwards correspond to an agreement between parties to exchange currencies at a predetermined date in the future, with the purchase price locked in at an exchange rate available as of the trading date. Over time, the prices of the FX forwards may vary as traders attempt to profit, or minimize risk exposure, as exchange rates fluctuate. The term "FX forwards" may include any of a variety of sub-products such as Non-Deliverable Forwards, Deliverable Forwards, Cash Settled Forwards, and/or the like. Because the rate of a particular FX forward is determined based on the available exchange rate at the time the trade is struck, the fixed rates associated with two different FX forwards will rarely be the same. As such, each FX forward that is entered may cause a separate line item to be booked until expiration or an opposite FX forward with the same fixed rate is struck. A financial institution managing a portfolio may have a first data storage capacity large enough to store information associated with the portfolio comprising m FX forwards. As such, it would be desirable to provide a way to blend FX forwards for reducing gross notional amounts and/or line items (e.g., FX forwards) on a financial organization's books, thus reducing a risk exposure of the financial organization to currency movements.

Systems and methods for blending a plurality of FX forwards may include determining a signed sum of notional values associated with each component of the currency pair, such as the primary currency component and the settlement currency component, of each of the plurality of FX forwards. These signed sums of the notional values may be used in blending the plurality of FX forwards, where each of the plurality of FX forwards having matching economics and a different associated fixed rate. A computing device may include a notional calculator to calculate the sums of the notional values and a blending module (e.g., a portfolio compression module) that may be configured to determine one or more remnant FX forwards for use in blending the plurality of FX forwards based, at least in part, using the determined sums of the notional values. This may reduce the gross notional and/or the total clearing line items associated with the original FX forwards. In some cases, the blending module may determine a single currency FX forward for blending the plurality of FX forwards.

A financial institution associated with a portfolio including the plurality of FX forwards may have one or more computing systems (e.g., servers, data repositories, processors, etc.) that may be used, at least in part, to store or otherwise manage portfolios of the financial institution's clients. These financial institution computing systems may be sized to manage a specified amount of data associated with aspects of the financial institution's business. This may include managing and/or processing information associated with the portfolios. As portfolios become larger for one or more of the financial institution's clients, the data storage capacity and/or processing power necessary to process and/or store this information may approach a storage capacity and/or processing power limit of the currently installed hardware. As such, the financial institution may be required to install more computing devices and/or upgrade existing computing components to handle the additional information storage and/or processing requirements. By monitoring, or otherwise managing the size of one or more portfolios, the financial institution may be able to proactively manage the computing requirements and the associated costs. For example, the financial institution may monitor a size of a client's portfolio. If the portfolio size approaches a threshold, the financial institution computing system may automatically initiate a portfolio compression process. In other cases, the financial institution computing system may provide an indication to an individual, such as a network manager, that the computing system is approaching the limits to allow manual initiation of a portfolio compression process. Alternatively, the computing system may store the portfolio in a compressed form for some or all clients so as to minimize the data storage and processing requirements.

The details of these and other embodiments of the present invention are set forth in the accompanying drawings and the description below. Other features and advantages of the invention will be apparent from the description and drawings.

BRIEF DESCRIPTION OF THE DRAWINGS

The present invention may take physical form in certain parts and steps, embodiments of which will be described in detail in the following description and illustrated in the accompanying drawings that form a part hereof, wherein:

FIG. 3-5 show a data tables illustrative of methods for blending an FX forward portfolio according to at least some embodiments.

DETAILED DESCRIPTION OF THE INVENTION

Figure 1:
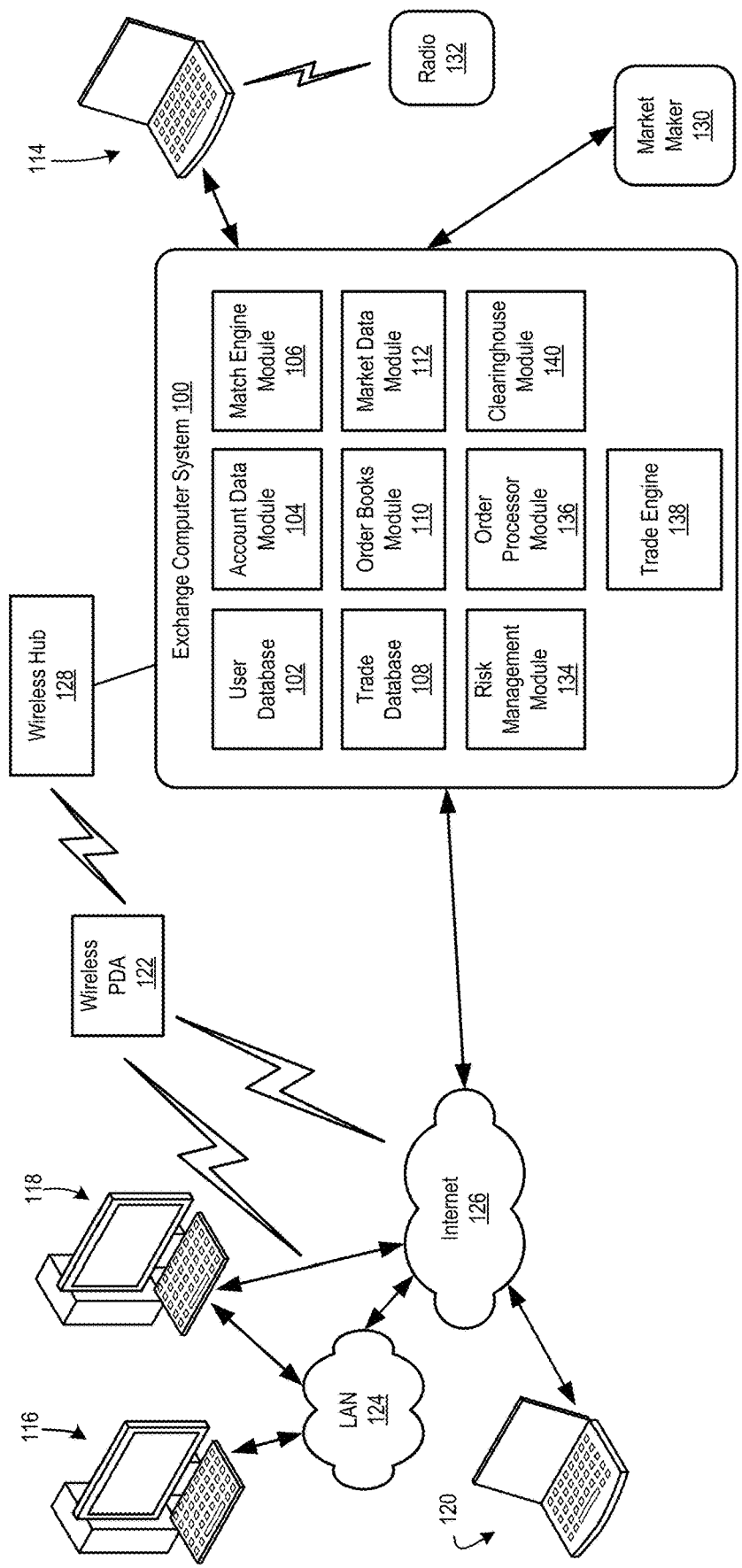
FIG. 1 shows an illustrative trading network environment for implementing trading systems and methods according to at least some embodiments.

In some cases, clients may desire to enter into one or more FX forwards in an OTC market to reduce risk associated with exposure to one or more currencies. For example, an organization may use FX forwards as a hedging tool that does not require any upfront payment from either party to the transaction. For example, a business organization may sell goods in a foreign market and may expect to receive the proceeds of the sale at some future date. Because the future sales may be subject to risk and/or other uncertainty based on the fluctuating exchange rates, the business organization may decide to enter one or more FX forwards transactions to hedge the risk associated with the fluctuating currency markets and/or the uncertainty associated with an expected profit due to the predicted exchange rate at the future date. For example, the business organization may sell product in a foreign market over a specified timeframe but, for a variety of reasons, the business organization may not receive the proceeds of the sale until some future date after the timeframe of the sale. For example, the business organization may sell product during the first quarter of the year, but not receive the proceeds of the sale(s) until a future date, such as a date in the fourth quarter of the year. Due to the fluctuations in the currency market, the organization may desire to hedge any potential lost profit due to an unfavorable exchange rate in the future. By hedging these risks, the parties to the FX forwards may have a goal to allow their assets and/or liabilities to at least remain near the starting levels and/or minimize any losses.

Generally, the currently available exchange rate dictates the costs associated with exchanging currencies in a currency pair, where the available exchange rate in the FX market over time. For example, a currency exchange rate for a currency pair (e.g., EUR/USD) may be quoted at a first rate at a time 0. A short time later (e.g., about 10 minutes, about 30 minutes, etc.), another currency exchange rate quote may be provided for the same currency pair, where all other terms remain the same but having a second exchange rate that is different than the first rate. Once the FX forwards are entered, the exchange rate will remain fixed for the lifetime of the FX forward. Over time, a FX forward purchaser (e.g., an individual, an organization, a business, etc.) may develop a portfolio of FX forwards, including Non-Deliverable Forwards, Deliverable Forwards, Cash Settled Forwards, and/or the like. Few, if any, FX forwards may have the same exchange rate resulting in a large number of FX forwards to remain open on the organization's books.

An organization or an individual may enter into multiple FX forwards during a given time frame (e.g., a day, a week, a month, etc.) and, as a result, may have multiple line items in their books in relation to these FX forwards. For example, a customer may have a first FX forward for exchanging a set amount (e.g., $100 million) of a first currency for an amount of a second currency, as defined by the Fixing Price (or Fixing Exchange Rate) and a second FX forward for exchanging an amount of the second currency for the same set amount (e.g., $100 million) of the same currency. Although these FX forwards are associated with the same notional amount of the first currency, the associated exchange rates are likely to be different. As such, these FX forwards will not net out. Rather, the $200 million in gross notional remains open on the organization's books. These FX forwards may further be subject to regulatory requirements, such as governmental requirements, international banking requirements (e.g., BASEL 3 requirements), and/or the like. These regulatory requirements may, in turn, subject the organization to capital charges (e.g., a specified cash reserve) to ensure that a financial organization has enough cash to cover their liabilities regarding their FX forwards portfolio.

In an illustrative example, a financial institution may have a house account having a number of FX forwards open in the account. Under the regulatory requirements, the financial institution is required to set aside capital (e.g., a margin account) to cover the open FX forwards. This cash requirement may be dependent upon, at least in part, on the gross notional amount and/or the total clearing line items associated with the FX forwards portfolio. As such, the financial organization can reduce its capital requirements by reducing the number of line items on their books, and/or by reducing the gross notional of the FX forwards portfolio.

In some cases, multiple line items having the same exchange rate or fixing price may be collapsed together (e.g., canceled). For example, a sold/short FX forward having an associated first notional amount of may be offset by a second notional amount associated with a buy/long FX forward when the short and long FX forwards have the same fixing price or exchange rate. However this is rare. For example, a FX forward participant may use an investment strategy for achieving the same exchange rate for two or more different FX forwards. In such cases, the customer may specify a desired exchange rate for a FX forward when contacting a dealer. While the dealer may be able to find a counter-party willing enter into an FX forward at that rate, the FX forward may incur a fee to equalize the economics of the FX forward. For example, at the desired exchange rate, the economics of the FX forward may favor the short party or the long party. By equalizing these differences, the FX forward may then be structured to allow the total currency value of the first currency leg to be equal to the second currency leg of the FX forward. In general, when the exchange rates are determined for the FX forwards, the precision may be specified by one or more parties to the FX forwards. In some cases, the precision of the rates may be limited to a defined precision common to the market, such as 2 decimal places, 5 decimal places, up to 7 decimal places or other such precision. In other cases, the rate precision may be specified to be a precision greater than 7 decimal places, such as 11 decimal places, up to 16 decimal places, etc.)

In some cases, a clearing house may monitor a portfolio of FX forwards to determine whether any of the total notional value of the FX forwards portfolio may be "torn up" or otherwise offset. For example, the clearing house may, on a periodic (e.g., daily) basis, process an algorithm to determine a net value of a client's FX forwards portfolio and send a message to the client to terminate a line item, or offset at least a portion of the gross notional value when two or more line items may be collapsed.

Exemplary Operating Environment

Aspects of at least some embodiments can be implemented with computer systems and computer networks that allow users to communicate trading information. An exemplary trading network environment for implementing trading systems and methods according to at least some embodiments is shown in FIG. 1. The implemented trading systems and methods can include systems and methods, such as are described herein, that facilitate trading and other activities associated with financial products based on currency pairs.

Computer system 100 can be operated by a financial product exchange and configured to perform operations of the exchange for, e.g., trading and otherwise processing various financial products. Financial products traded or otherwise processed by the exchange may include over-the-counter (OTC) products such as OTC forwards, OTC options, etc. Financial products of the exchange may also include, without limitation, futures contracts, options on futures contracts ("futures contract options"), and other types of derivative contracts.

Computer system 100 receives orders for financial products, matches orders to execute trades, transmits market data related to orders and trades to users, and performs other operations associated with a financial product exchange. Exchange computer system 100 may be implemented with one or more mainframe, desktop or other computers. In one embodiment, a computer device uses one or more 64-bit processors. A user database 102 includes information identifying traders and other users of exchange computer system 100. Data may include user names and passwords. An account data module 104 may process account information that may be used during trades. A match engine module 106 is included to match prices and other parameters of bid and offer orders. Match engine module 106 may be implemented with software that executes one or more algorithms for matching bids and offers.

A trade database 108 may be included to store information identifying trades and descriptions of trades. In particular, a trade database may store information identifying the time that a trade took place and a price associated with the trade (e.g., a bid price, an ask price, etc.). An order book module 110 may be included to store prices and other data for bid and offer orders, and/or to compute (or otherwise determine) current bid and offer prices. A market data module 112 may be included to collect market data, e.g., data regarding current bids and offers for OTC FX forwards, futures contracts, futures contract options and other OTC or derivative products. Module 112 may also prepare the collected market data for transmission to users. A risk management module 134 may be included to compute and determine a user's risk utilization in relation to the user's defined risk thresholds. An order processor module 136 may be included to decompose delta based and bulk order types for further processing by order book module 110 and match engine module 106.

A clearinghouse module 140 may be included as part of exchange computer system 100 and configured to carry out clearinghouse operations. Module 140 may receive data from and/or transmit data to trade database 108 and/or other modules of computer system 100 regarding trades of OTC FX forwards, futures contracts, futures contracts options, OTC options and contracts, and other financial products. Clearinghouse module 140 may facilitate the financial product exchange acting as one of the parties to every traded contract or other product. For example, computer system 100 may match an offer by party A to sell a financial product with a bid by party B to purchase a like financial product. Module 140 may then create a financial product between party A and the exchange and an offsetting second financial product between the exchange and party B. As another example, module 140 may maintain margin data with regard to clearing members and/or trading customers. As part of such margin-related operations, module 140 may store and maintain data regarding the values of various contracts and other instruments, determine mark-to-market and final settlement amounts, confirm receipt and/or payment of amounts due from margin accounts, confirm satisfaction of final settlement obligations (physical or cash), etc. As discussed in further detail below, module 140 may determine values for performance bonds associated with trading in products based on various types of currency pairs.

Each of modules 102 through 140 could be separate software components executing within a single computer, separate hardware components (e.g., dedicated hardware devices) in a single computer, separate computers in a networked computer system, or any combination thereof (e.g., different computers in a networked system may execute software modules corresponding more than one of modules 102-140).

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may implement one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics, radio links or other media.

A wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet. Computers 116, 118 and 120 may communicate with each other via the Internet 126 and/or LAN 124.

One or more market makers 130 may maintain a market by providing constant bid and offer prices for a derivative or security to exchange computer system 100. Exchange computer system 100 may also include trade engine 138. Trade engine 138 may, e.g., receive incoming communications from various channel partners and route those communications to one or more other modules of exchange computer system 100.

One skilled in the art will appreciate that numerous additional computers and systems may be coupled to exchange computer system 100. Such computers and systems may include, without limitation, additional clearing systems (e.g., computer systems of clearing member firms), regulatory systems and fee systems.

The operations of computer devices and systems shown in FIG. 1 may be controlled by computer-executable instructions stored on non-transitory computer-readable media. For example, computer device 116 may include computer-executable instructions for receiving market data from exchange computer system 100 and displaying that information to a user. As another example, clearinghouse module 140 and/or other modules of exchange computer system 100 may include computer-executable instructions for performing operations associated with determining performance bond contributions associated with holdings in products that are based on various types of currency pairs.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Illustrative Embodiments

In some cases, the clearinghouse module 140 may be configured to monitor and/or otherwise manage a capital obligation associated with a plurality of FX forwards, such as an FX forwards portfolio. In at least some embodiments, the exchange computer system 100 (or "system 100") receives, stores, generates and/or otherwise and processes data. In accordance with various aspects of the invention, a clearinghouse (e.g., the clearinghouse module 140) may act as a guarantor of the agreement for the derivative. As discussed above, a financial product (e.g., an OTC FX forwards) may be cleared and guaranteed by the clearinghouse. This may promise more interesting capital efficiencies to allow institutions to reduce a capital charge associated with a plurality of FX forwards, such as by reducing a gross notional and/or reducing line items associated with the plurality of FX forwards.

Figure 2:
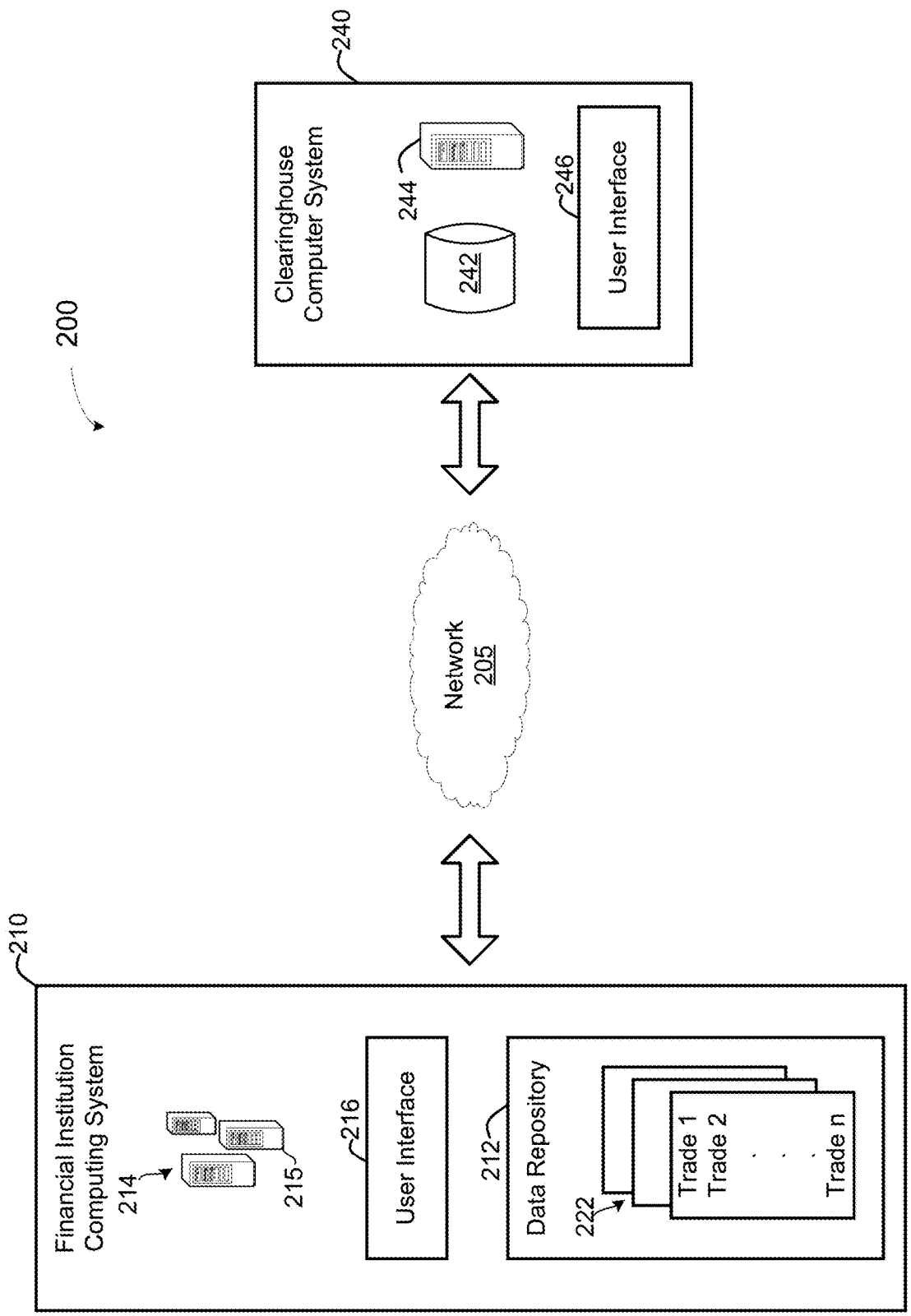
FIG. 2 shows a portion of an illustrative system for blending notional values associated with a plurality of FX forwards according to at least some embodiments.

FIG. 2 shows a portion of an illustrative system 200 for blending a plurality of FX forwards according to at least some embodiments. In some cases, the illustrative system 200 may include a financial institution computing system 210 communicatively coupled to a clearinghouse computer system 240 via a network 205 (e.g., a wide area network (WAN), the LAN 124, the Internet 126, etc.). The financial institution computing system 210 may include a data repository 212, one or more computing devices 214, and, in some cases, at least one user interface 216. In some cases, the data repository 212 may store information about one or more portfolios 222 including a plurality of FX forwards, where the portfolios 222 may include information about two or more different FX forwards (e.g., trade 1, trade 2, trade n, etc.). For example, the FX forward information may include a currency pair, an exchange rate value, a notional amount, and/or a buy or sell position associated with each currency of the currency pair for each of the plurality of different FX forwards portfolios 222. In some cases, the portfolios 222 may be associated with the financial institution, and/or one or more different customers of the financial institution. For example, a financial entity and/or a customer of the financial entity may desire to enter into one or more different FX forwards to hedge financial risk due to an exchange rate associated with a currency. In some cases, a computing device 215 and/or the user interface 216 may be used to facilitate user access to the one or more of the portfolios 222. For example, a user may log into the financial institution computing system 210 via one or more user interface screens accessible via the user interface 216. In some cases, the user interface 216 is at a geographical location local to the financial institution computer system 210 and/or at a geographical location of the user.

In some cases, the clearinghouse computer system 240 may include one or more of a data repository 242, a computer device 244 and/or a user interface 246. The clearinghouse computer system 240 may be communicatively coupled to at least one financial institution computer system, such as the financial institution computing system 210 via the network 205. In some cases, the clearinghouse computer system 240 may be configured to obtain information about one or more of the portfolios 222, process the information to blend notional amounts associated with the different FX forwards held in the portfolios 222 and communicate information about the blended FX forwards to the financial institution computing system 210 to reduce one or more line items associated with the portfolios 222 and/or to reduce a gross notional value associated with the portfolios 222 to reduce a total capital charge incurred by the financial institution in relation to the portfolios 222.

FIG. 3 illustrates a data table 800 illustrative of a method for blending notional amounts associated with FX forwards a portfolio by the clearinghouse computing system 240 according to certain embodiments. The data table 800 includes information about a plurality of FX forwards 810 (e.g., one or more of the portfolios 222) held at the financial institution, an associated currency pair 811 (e.g., USD/BRL, EUR/USD, USD/RMB, etc.), an exchange rate 812, and a notional amount 821 associated with a first currency of the currency pair (e.g., USD, etc.). In some cases, the table 800 may include a signed notional amount 823 representative of a buy (e.g., a positive value) or a sell (e.g., a negative value) position. In some cases, the table 800 may include a signed weighted US notional value 824. The table 800 may also include information about the contra currency (e.g., BRL, etc.) of the currency pair 811, such as a notional amount 831 and a signed notional amount 833 corresponding to a long or a short position taken in each of the currencies of the currency pair. The notional amount 831 of the contra currency may be determined as a function of the rate 812 and the notional amount 821 of the base currency, where the rate 812 corresponds to an exchange rate between the base currency and the contra currency.

In blending the FX forwards 810 of the portfolio, the notional amount 821 of the first currency may be summed to determine a total notional amount 840 associated with the first currency. Similarly, the signed notional amount 823 associated with the base currency may be summed to determine a total net position 853 in the base currency and the signed notional amount 833 associated with the contra currency may be summed to determine a total net position 863 in the contra currency of the currency pair. In some cases, the total net position 863 of the contra currency may net out to zero. In such cases, the FX forward portfolio may be compressed using a "full netting" mechanism.

In an illustrative example, the full netting mechanism may be used when the long positions (e.g., the buys) and the short positions (e.g., the sells) on the same FX forward/value date combination and the notional amounts of buys and sells for the base currency or contra net out to zero. The rates associated with the FX forwards may be the same, but that is not required as the full netting mechanism can operate when the rates are different within all the FX forwards 811 held in the portfolio. Because the notional amounts associated with the contra currency net to zero, a residual amount (e.g., the sum 853) in the base currency remains to be settled. To represent this residual cash flow (e.g., the residual amount 873) associated with the base currency, the existing FX forwards 810 may be removed from the portfolio and a new single currency FX forward 870 (e.g., USD/USD) associated with the base currency may be booked corresponding to the residual amount 873 in the currency that settles as a residual amount for the same value date. While the single currency FX forward may represent a cash payment, one or more computing systems associated with the lifecycle of an FX forward may not be able to process the cash payment. For example, a financial institution may utilize a front end system for order entry of one or more FX forwards products, a risk management system for determining margining requirements associated with portfolios of the FX forwards products, and a settlement computing system for settling open FX forwards products, such as upon value date. In many cases, the order entry computing system on the front end may not be capable of booking cash transactions (e.g., a cash payment) without modifications of the front end system itself. However, the front end system (e.g. order entry system) may be easily modified to accept an FX forward comprising a currency pair of the same currency (e.g., USD/USD). As such, the remnant amount of the remnant trade may be entered as a single currency FX forward 870 at the front end and may correspond to a currency pair of the same currency (e.g., USD/USD) and having an exchange rate 872 of 1. This remnant trade represented by the single currency FX forward 870 may still represent a cash settlement value, but does not require a modification of the existing systems and may be processed the same, or at least similarly, to other FX forwards by the front end computing systems, the risk management computing systems and/or the settlement computing systems.

In many cases, the single currency FX forward 870 may include a same settlement date as the FX forwards 810 of the original portfolio. As such, a user interface may be used to allow a bank, or other financial entity, to provide for early settlement of this remnant cash value. For example, a user may desire to close out the remaining liability to the compressed portfolio. In such cases, a settlement order may be entered to settle the single currency FX forward 870 before the defined settlement date for the cash value, often in return for a fee (e.g., fixed fee, a percentage fee, etc.) of the nominal value. In the illustrative example, the single currency, a financial organization may offer to settle a single currency FX forward 870 has a notional value 873 of $572,943.68 and may have an associated settlement date (e.g., value date) of the original FX forward. In some cases, the owner of the portfolio may desire to close out the remainder of the portfolio before the settlement date. Because the single currency FX forward has an exchange rate of 1, the market value may largely correspond a duration until the settlement date was reached. As such, the user interface may be used to offer the portfolio owner one or more early settlement options, such as by using a fixed fee, a fee determined as a percentage of the notional value, a fee as a function of time (eg. NPV), and/or the like. In return for the fee, the portfolio owner can close out any remaining liability to the original FX forwards 810.

In many cases, the notional values associated with either of the currencies in the portfolio may not net out to zero, so that the full netting option is not applicable. In such cases, one or more "partial netting" mechanisms may be used to blend or otherwise compress portfolios of FX forwards. FIGS. 4 and 5 illustrate data tables 900, 1000 illustrative of methods for blending notional amounts associated with FX forwards in a portfolio by the clearinghouse computing system 240 according to certain embodiments.

As discussed above, the data tables 900, 1000 includes information about a plurality of FX forwards 910, 1010 (e.g., one or more of the portfolios 222) held at the financial institution, an associated currency pair 911, 1011 (e.g., USD/BRL, USD/Euro, USD/RMB, etc.), exchange rates 912, 1012, and notional amounts 921, 1021 associated with a base currency of the currency pair (e.g., USD, etc.). In some cases, the tables 900, 1000 may include a signed notional amount 923, 1023 representative of a buy (e.g., a positive value) or a sell (e.g., a negative value) position. In some cases, the tables 900, 1000 may include a signed weighted US notional value 924, 1024. The tables 900, 1000 may also include information about the contra currency (e.g., BRL, etc.) of the currency pair 911, 1011, such as a notional amount 931, 1031 and a signed notional amount 933, 1033 corresponding to a long or a short position taken in each of the currencies of the currency pair. The notional amount 931, 1031 of the contra currency may be determined as a function of the rate 912, 1012 and the notional amount 921, 1021 of the base currency, where the rate 912, 1012 corresponds to an exchange rate between the base currency and the contra currency.

In some cases, a compression computing module (not shown) may be configured to calculate a sum of the absolute notional values of the base currency 921 associated with each of the FX forwards 910 held in the portfolio and calculate a sum of the signed and weighted notional values 923 and 933. The compression computing module may then determine whether to use one of a plurality of different partial netting methodologies. For example, Table 900 of FIG. 4 illustrates a partial netting methodology resulting in two remnant FX forwards associated with the same currency pair and settlement date of the original FX forwards 910. This methodology may be based, at least in part, on a maximum rate value 972 that may be associated with a first remnant FX forward 970 and a minimum rate value 982, less than the maximum rate value 972, which may be associated with a second remnant FX forward 980. In some cases, the maximum rate value 972 may be determined in a number of ways, such as by determining a maximum fixed rate 355 associated with the portfolio, determining an average of the rates associated with the FX forwards 910, receiving a user selected rate, multiplying a rate by a multiplier (e.g., a user selected multiplier), determining a current market rate, determining a past market rate, by adding or subtracting basis points from a selected rate, and/or the like. Similarly, the minimum rate value 982 may be determined in a number of ways, such as by determining a minimum rate associated with the FX forwards 910, determining an average of the rates associated with the FX forwards 910, receiving a user selected rate, multiplying a rate by a multiplier (e.g., a user selected multiplier), determining a current market rate, determining a past market rate, adding or subtracting basis points from a selected rate and/or the like.

Once the maximum rate 972 and the minimum rate 982 are determined, the notional amount associated with each currency for each remnant FX forward 970, 980 may be determined. For example, the notional amount 971 associated with the first remnant FX forward 970 may be determined based on the selected rates. For example, the notional amount 971 (e.g., $Notional_{primary}$) associated with the first remnant FX forward 970 may be determined using the formula:

$$Notional_{primary} = (\text{Weighted Average Notional} - (\text{Net Notional} * Rate_{min}))/(R_{max} - R_{min})$$

Similarly, the notional amount 981 (e.g., $Notional_{settlement}$) associated with the second FX forward 970 may be determined using the formula:

$$Notional_{settlement} = -(\text{Net Notional} - Notional_{primary})$$

In the illustrative example, the notional amounts 971 and 981 may be associated with the base currency (e.g., USD) of the currency pair and the notional amounts 973 and 983 may be associated with the contra currency (e.g., BRL). Once determined, the notional amount 971 and the maximum rate 972 may be used to calculate the notional amount 973 of the first remnant FX forward 970 using the formula:

$$Notional_2 = (Notional_1 * Rate_{max})$$

Similarly, the notional amount 981 and the minimum rate 982 may be used to calculate the notional amount 983 of the second remnant FX forward 980 using the formula:

$$Notional = -(Notional_2 * Rate_{min})$$

Once determined, a portfolio compression module may be configured to close out the FX forwards 910 of the original portfolio and generate, such as via an order entry system, the first remnant FX forward 970 and the second remnant FX forward 980 to be held in the portfolio. When complete, the compressed portfolio comprising the first and second remnant FX forwards 970, 980 may have a same net notional associated with each of the base currency (e.g., USD) and the contra currency (e.g., BRL) as the original FX forwards 910. However the gross notional associated with each currency has been reduced.

Table 1000 illustrates a different netting methodology that may compress the original FX forwards 1010 into a first remnant FX forward 1070 (e.g., USD/BRL) for settling the risk exposure to a currency (e.g., BRL) of the currency pair and a remnant single currency FX forward (e.g., USD/USD) to settle the remaining exposure to the second currency (e.g., USD) of the currency pair. In some cases, the rate 1072 associated with the first remnant FX forward may be determined using a maximum fixed rate 1055 associated with the portfolio, a minimum fixed rate 1050 associated with the portfolio, the rounded average rate of the FX forwards 1010, a user selected rate, a current market rate, a past market rate, etc.

Using the residual partial netting methodology, the portfolio compression module (not shown) may create a first remnant FX forward 1070 based on the rate 1072 that may be determined as a maximum rate associated with the portfolio, the Max rate plus or minus one or more basis points, a user defined value, a current exchange rate, and/or the like. Once the rate 1072 has been determined, the notional amount 1073 associated with the primary currency (e.g., BRL) may be set equal to the net notional 1063 corresponding to the net exposure to the primary currency in the original portfolio. Next, the notional amount 1071 associated with the settlement currency (e.g., USD) may be determined using the notional amount 1073 and the rate 1072 using the formula:

$$Notional_{settlement} = -(Notional_{primary})/R_{max}$$

The residual amount 1081 of the settlement currency may be determined by using the Net amount of the settlement currency, such as by using the formula:

$$Residual_{settlement} = (\Sigma(\text{signed Notional})_{settlement}) - Notional_{settlement}$$

As can be seen, this residual amount 1081 corresponds to the difference between the total signed notional amount 1053 and the notional amount 1071 associated with the settlement currency of the first remnant FX forward 1070. This residual amount 1081 may be booked as a single currency FX forward 1080 (e.g., a USD/USD trade) with a rate of 1 for the same value dates associated with the original portfolio.

Figure 6:
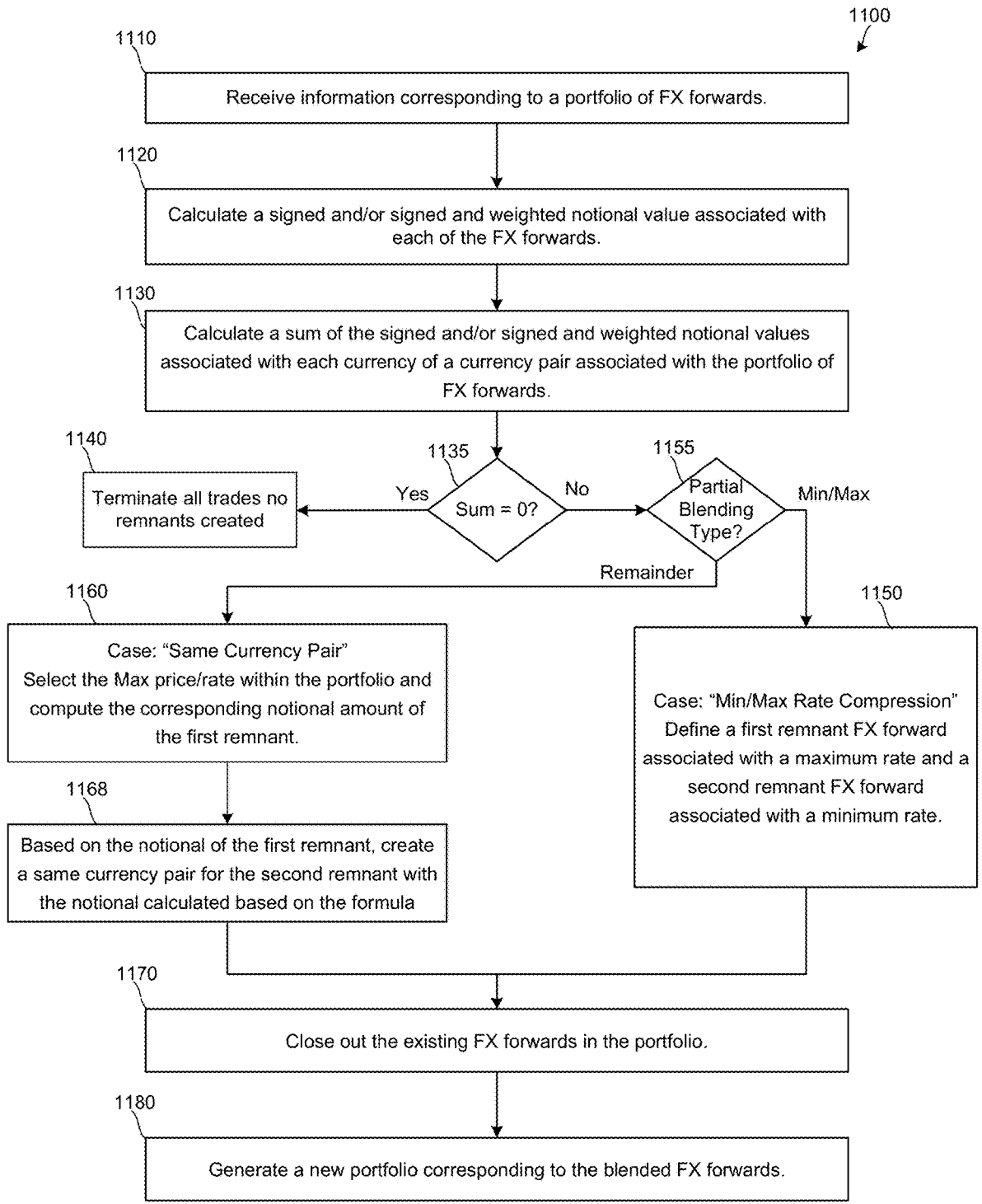
FIG. 6 shows an illustrative flow diagram for blending a plurality of FX forwards in a portfolio according to at least some embodiments.

FIG. 6 shows an illustrative flow diagram for blending a plurality of FX forwards in a portfolio according to at least some embodiments. At 610, a portfolio compression module may receive information corresponding to a portfolio of FX forwards. For example, the portfolio compression module may be included in the exchange computing system 100 and/or the clearinghouse computing system 240. The portfolio compression module may be communicatively coupled to the financial institution computing system 210 and receive the information about the portfolio 222 containing a plurality of FX forwards via the network 205. At 1120, the portfolio compression module may calculate a signed weighted notional value associated with each of the FX forwards included in the portfolio 222. For example, the portfolio compression module may calculate a signed notional value for each FX forward of the portfolio by multiplying the notional value by 1 for a buy transaction and by multiplying the notional value by a (−1) for a sell transaction. The signed, weighted notional value may be calculated by multiplying the signed notional by the rate associated with each FX forward.

At 1130, the portfolio compression module may calculate a sum of the signed and/or signed and weighted notional values associated with each of the FX forwards associated with the portfolio 222. For example, a sum of the signed notional values associated with the primary currency (e.g., Euro, GBP, etc.), a sum of the signed notional values associated with the settlement currency (e.g., USD), and/or a sum of the signed and weighted notional values associated with the settlement currency (e.g., USD) may be calculated by the portfolio compression module.

Once calculated, the portfolio compression module may use one or more of a minimum exchange rate, a maximum exchange rate, the sum of the signed notional values and/or the sum of the signed and weighted notional values to determine a portfolio compression method (e.g., the full compression method of Table 800, the min/max partial compression method of Table 900, the residual partial compression method of Table 1000, etc.) for use in compressing the portfolio 222. For example, the portfolio compression module may at 1135 determine whether a currency has netted out. For example, the portfolio compression module may determine whether a sum of the signed notional values is equal to 0. In such cases, the full compression method may be used at 1140 to compress the portfolio as no remnant trades would be created upon compression. In other words, the FX forwards will net to zero. If not, a partial compression method may be used.

At 1145, the portfolio compression module may determine which partial compression method to use. In some cases, the portfolio compression module may determine to use a partial compression method based upon one or more rules, such as a rule to improve the processing power of a computing device or a rule to reduce the use of a storage medium by a specified percentage. For example, the portfolio compression module may be configured to use a first compression method (e.g., the min/max rate compression method) when the minimum and the maximum rates are within a specified range. In other cases, the portfolio compression module may determine to use a second compression method (e.g., the remainder partial compression method) under specified conditions, such as when the difference between the minimum and maximum rates is greater than a threshold. In some cases, the portfolio compression module may be communicatively coupled to a user interface device that may allow a user to specify a compression method and/or to override a compression method determination.

If the min/max compression method has been selected (e.g., by a user, by the portfolio compression module, etc.) at 1155, then at 1150 the portfolio compression module may determine the first remnant FX forward associated with the determined maximum rate and determine the second remnant FX forward associated with the determined minimum rate, as discussed above in reference to table 900. If at 1155, the portfolio compression module may determine a first remnant FX forward associated with the determined maximum rate and a second remnant FX forward associated with the settlement currency of the currency pair associated with the FX forwards, as discussed above in reference to table 1000.

Once the portfolio compression module determines the blended remnant FX forwards at 1140, 1150, or 1160, the portfolio compression module may then trigger a settlement module to close the existing FX forwards of the portfolio 222, enter the generated remnant FX forwards into the front end system and assign them to the appropriate portfolio 222 or generate via the front end order entry system a new portfolio comprising the blended FX forwards.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims.

The invention claimed is:

1. A method comprising:
reducing, automatically by a computing system, an amount of data required by a data repository to store a data structure having stored therein three or more data elements each storing data indicative of one financial instrument of a portfolio of a plurality of financial instruments, each characterized by a value and comprising an obligation to exchange a first asset for a second asset at a later date at one of a plurality of different associated then current conversion factors when the obligation was entered into, the one then current conversion factor subsequently varying thereafter, the plurality of financial instruments being characterized by a total value comprising a sum of the values of each of the plurality of financial instruments, and a total net value comprising a sum of each of the plurality of financial instruments as a function of the obligation to exchange thereof, wherein the reducing comprises using a compression module of the computing system to generate a replacement data structure having a smaller data size and characterized by the total net value and a lesser total value by:
accessing, via a network, the data repository;
generating first remnant data indicative of a partial netting of the plurality of financial instruments based on a first conversion factor and a first value;
generating second remnant data indicative of the plurality of financial instruments based on a residual of the total value as compared to the first value; and
generating, by a clearinghouse computing system, the replacement data structure comprising a first data element storing the first remnant data and a second data element storing the second remnant data, the replacement data structure having fewer data elements than the data structure, and thereby a smaller data size, while being characterized by the total net value, but a lesser total value, of the data structure that is to be replaced; and
storing, in the data repository, the replacement data structure in place of the data structure, the replacement data structure having a smaller data size and a same total net value but a reduced total value as compared with the data structure.

2. The method of claim 1, wherein the first conversion factor is one of: a maximum of the plurality of different associated then current conversion factors of the plurality of financial instruments, an average of the plurality of different associated then current conversion factors of the plurality of financial instruments, a user selected conversion factor, a multiple of a conversion factor, a current conversion factor, a prior conversion factor, or an adjustment thereto, and wherein the first value is calculated using a weighted average value, a net value multiplied by a second conversion factor, and a difference between the first conversion factor and the second conversion factor.

3. The method of claim 1, wherein the second remnant data is further generated based on a second conversion factor which comprises one of: a minimum conversion factor of the plurality of different associated then current conversion factors of the plurality of financial instruments, an average of the plurality of different associated then current conversion factors of the plurality of financial instruments, a user selected conversion factor, a current conversion factor, a prior conversion factor, or an adjustment thereto.

4. The method of claim 1, wherein each of the plurality of financial instruments comprises a foreign exchange (FX) forward, the then current conversion factor comprising a then current exchange rate between currencies underlying the FX forward.

5. The method of claim 1, wherein determining at least the first conversion factor comprises: determining the first conversion factor and a second conversion factor, wherein the first conversion factor is greater than the second conversion factor.

6. The method of claim 1, wherein determining at least the first conversion factor comprises: determining the first conversion factor and a second conversion factor so that a total value associated with a first financial instrument of the portfolio and a second financial instrument of the portfolio is minimized.

7. The method of claim 1, wherein determining at least the first conversion factor comprises: determining at least one of the first conversion factor and a second conversion factor based on a current market exchange conversion factor associated with a currency pair corresponding to each of the plurality of financial instruments of the portfolio stored in the data structure.

8. The method of claim 1, further comprising:
determining a signed value associated with each of the plurality of financial instruments of the portfolio, wherein the signed value for a particular financial instrument of the portfolio is determined based on a buy order or a sell order or a conversion factor associated with the particular financial instrument of the portfolio and a value associated with the particular financial instrument of the portfolio.

9. The method of claim 8, further comprising:
determining a value associated with the first remnant data using at least the first conversion factor and a sum of signed values that are associated with each of the plurality of financial instruments of the portfolio.

10. The method of claim 9, wherein determining the first remnant data comprises:
determining the first remnant data based on the first conversion factor and a second conversion factor.

11. The method of claim 1, wherein the second remnant data corresponds to a single currency financial instrument of the portfolio.

12. The method of claim 1, further comprising:
comparing, by the clearinghouse computing system, to a threshold, a count of data elements of the data structure, wherein each data element corresponds to a different financial instrument held in the portfolio; and when the threshold is met, generating the replacement data structure and replacing, by the clearinghouse computing system, the data structure therewith based on data stored in each of the data elements of the data structure.

13. The method of claim 1, comprising:
determining the total value associated with a plurality of financial instruments of the portfolio having same economics;
comparing the total value to a criterion; and
blending, responsive to the total value meeting the criterion, at least a portion of the plurality of financial instruments of the portfolio using the first remnant data and the second remnant data.

14. The method of claim 1, wherein the plurality of financial instruments of the portfolio is associated with a particular client of a financial institution.

15. The method of claim 1, comprising:
blending at least a portion of the plurality of financial instruments of the portfolio using the first remnant data and the second remnant data on a daily basis; and
communicating, via the network, information corresponding to the first remnant data and the second remnant data to a financial institution associated with the plurality of financial instruments of the portfolio.

16. A non-transitory computer-readable medium containing computer-executable instructions, that when executed by a processor, cause one or more computing devices to:
reduce, automatically by a compression module of a computing system, an amount of data required by a data repository to store a data structure having stored therein three or more data elements each storing data indicative of one financial instrument of a portfolio of a plurality of financial instruments, each characterized by a value and comprising an obligation to exchange a first asset for a second asset at a later date at one of a plurality of different associated then current conversion factors when the obligation was entered into, the one then current conversion factor subsequently varying thereafter, the plurality of financial instruments being characterized by a total value comprising a sum of the values of each of the plurality of financial instruments, and a total net value comprising a sum of each of the plurality of financial instruments as a function of the obligation to exchange thereof, wherein the computer-executable instructions are further executable by the processor to cause the one or more computing devices, so as to generate a replacement data structure having a smaller data size and characterized by the total net value and a lesser total value, to:
access, via a network, the data repository;
generate first remnant data indicative of a partial netting of the plurality of financial instruments based on a first conversion factor and a first value;
generate second remnant data indicative of the plurality of financial instruments based on a residual of the total value as compared to the first value; and
generate, by a clearinghouse computing system, the replacement data structure comprising a first data element storing the first remnant data and a second data element storing the second remnant data, the replacement data structure having fewer data elements than the data structure and thereby a smaller data size, while being characterized by the total net value, but a lesser total value, of the data structure that is to be replaced; and
store, in the data repository, the replacement data structure in place of the data structure, the replacement data structure having a smaller data size and a same total net value but a reduced total value as compared with the data structure.

17. The non-transitory computer-readable medium of claim 16, wherein the first conversion factor is one of: a maximum of the plurality of different associated then current conversion factors of the plurality of financial instruments, an average of the plurality of different associated then current conversion factors of the plurality of financial instruments, a user selected conversion factor, a multiple of a conversion factor, a current conversion factor, a prior conversion factor, or an adjustment thereto, and wherein the first value is calculated using a weighted average value, a net value multiplied by a second conversion factor, and a difference between the first conversion factor and the second conversion factor.

18. The non-transitory computer-readable medium of claim 16, wherein the second remnant data is further generated based on a second conversion factor which comprises one of: a minimum conversion factor of the plurality of different associated then current conversion factors of the plurality of financial instruments, an average of the plurality of different associated then current conversion factors of the plurality of financial instruments, a user selected conversion factor, a current conversion factor, a prior conversion factor, or an adjustment thereto.

19. The non-transitory computer-readable medium of claim 16, wherein each of the plurality of financial instruments comprises a foreign exchange (FX) forward, the then current conversion factor comprising a then current exchange rate between currencies underlying the FX forward.

20. The non-transitory computer-readable medium of claim 16, wherein determining at least the first conversion factor comprises:
determining the first conversion factor and a second conversion factor, wherein the first conversion factor is greater than the second conversion factor.

21. The non-transitory computer-readable medium of claim 16, wherein the instructions, when executed by the processor, further cause the one or more computing devices to:
determine the first conversion factor and a second conversion factor so that a total value associated with a first financial instrument of the portfolio and a second financial instrument of the portfolio is minimized.

22. The non-transitory computer-readable medium of claim 16, wherein the instructions, when executed by the processor, further cause the one or more computing devices to:
determine at least one of the first conversion factor and a second conversion factor based on a current market exchange conversion factor associated with a currency pair corresponding to each of the plurality of financial instruments of the portfolio stored in the data structure.

23. The non-transitory computer-readable medium of claim 16, wherein the instructions, when executed by the processor, further cause the one or more computing devices to:
determine a signed value associated with each of the plurality of financial instruments of the portfolio, wherein the signed value for a particular financial instrument of the portfolio is determined based on a buy order or a sell order or a conversion factor associated with the particular financial instrument of the portfolio and a value associated with the particular financial instrument of the portfolio.

24. The non-transitory computer-readable medium of claim 23, wherein the instructions, when executed by the processor, further cause the one or more computing devices to:
determine a value associated with the first remnant data using at least the first conversion factor and a sum of signed values that are associated with each of the plurality of financial instruments of the portfolio.

25. The non-transitory computer-readable medium of claim 24, wherein the instructions, when executed by the processor, further cause the one or more computing devices to:
determine the first remnant data based on the first conversion factor and a second conversion factor.

26. The non-transitory computer-readable medium of claim 16, wherein the second remnant data comprises a single currency financial instrument of the portfolio.

27. The non-transitory computer-readable medium of claim 16, wherein the instructions, when executed by the processor, further cause the one or more computing devices to:
compare, by the clearinghouse computing system, to a threshold, a count of data elements of the data structure, wherein each data element corresponds to a different financial instrument held in the portfolio; and
when the threshold is met, generate the replacement data structure and replacing, by the clearinghouse computing system, the data structure therewith based on data stored in each of the data elements of the data structure.

28. The non-transitory computer-readable medium of claim 16, wherein the instructions, when executed by the processor, further cause the one or more computing devices to:
determine the total value associated with a plurality of financial instruments of the portfolio having same economics;
compare the total value to a criterion; and
blend, responsive to the total value meeting the criterion, at least a portion of the plurality of financial instruments of the portfolio using the first remnant data and the second remnant data.

29. The non-transitory computer-readable medium of claim 16, wherein the plurality of financial instruments of the portfolio is associated with a particular client of a financial institution.

30. The non-transitory computer-readable medium of claim 16, wherein the instructions, when executed by the processor, further cause the one or more computing devices to:
blend at least a portion of the plurality of financial instruments of the portfolio using the first remnant data and the second remnant data on a daily basis; and
communicate, via the network, information corresponding to the first remnant data and the second remnant data to a financial institution associated with the plurality of financial instruments of the portfolio.

31. A system comprising:
a processor and a memory coupled therewith, the memory having stored therein computer executable instructions that when executed by the processor cause the processor to implement a portfolio compression module of a clearinghouse computing system configured to reduce, automatically, an amount of data required by a data repository to store a data structure having stored therein three or more data elements each storing data indicative of one financial instrument of a portfolio of a plurality of financial instruments, each characterized by a value and comprising an obligation to exchange a first asset for a second asset at a later date at one of a plurality of different associated then current conversion factors when the obligation was entered into, the one then current conversion factor subsequently varying thereafter, the plurality of financial instruments being characterized by a total value comprising a sum of the values of each of the plurality of financial instruments, and a total net value comprising a sum of each of the plurality of financial instruments as a function of the obligation to exchange thereof, the portfolio compression module being further configured, so as to generate a replacement data structure having a smaller data size and characterized by the total net value and a lesser total value, to:

access, via a network, the data repository;

generate first remnant data indicative of a partial netting of the plurality of financial instruments based on a first conversion factor and a first value;

generate second remnant data indicative of the plurality of financial instruments based on a residual of the total value as compared to the first value; and generate, by the clearinghouse computing system, the replacement data structure comprising a first data element storing the first remnant data and a second data element storing the second remnant data, the replacement data structure having fewer data elements than the data structure and thereby a smaller data size, while being characterized by the total net value, but a lesser total value, of the data structure that is to be replaced; and store, in the data repository, the replacement data structure in place of the data structure, the replacement data structure having a smaller data size and a same total net value but a reduced total value as compared with the data structure.

* * * * *